Oct. 8, 1957

H. J. STOUDER 2,808,750

FLYWHEEL SPANNER WRENCH

Filed Dec. 5, 1955

*INVENTOR.*
HAROLD J. STOUDER

BY

*Jerome R. Cox*

ATTORNEY

United States Patent Office 2,808,750
Patented Oct. 8, 1957

2,808,750

FLYWHEEL SPANNER WRENCH

Harold J. Stouder, Reynoldsburg, Ohio

Application December 5, 1955, Serial No. 551,061

1 Claim. (Cl. 81—90)

The inventions disclosed in this application relate to wrenches. They are particularly useful in connection with flywheels of lawn mower motors. The inventions are illustrated by a wrench adapted for use in connection with the flywheels of lawn mower motors.

There are several types of lawn mower motors each having a flywheel of different configuration. However, each of these motors has a flywheel with fins spaced at regular intervals. Some of the motors have flywheels with fins placed at 30° intervals so that there are 12 fins around the circumference of the motor and others have fins placed at 22½° intervals so that there are 16 fins around the circumference of the motor.

It is the object of my invention to provide a wrench which is useful in connection with various objects which are desired to be held thereby.

It is a more specific object of my invention to provide a wrench which is useful in connection with substantially all types of flywheels used on the present day lawn mowers.

It is a further object of my invention to provide a wrench which can be quickly applied to the flywheels of such motors but which will hold any such flywheel securely while the locking nut or bolt thereof is being loosened or tightened and will not slip nor injure the fins of the flywheel.

Further objects and features of my invention will be apparent from the subjoined specification and claim when considered in connection with the accompanying drawings.

In the drawings which illustrate an embodiment of my invention:

Figure 1:
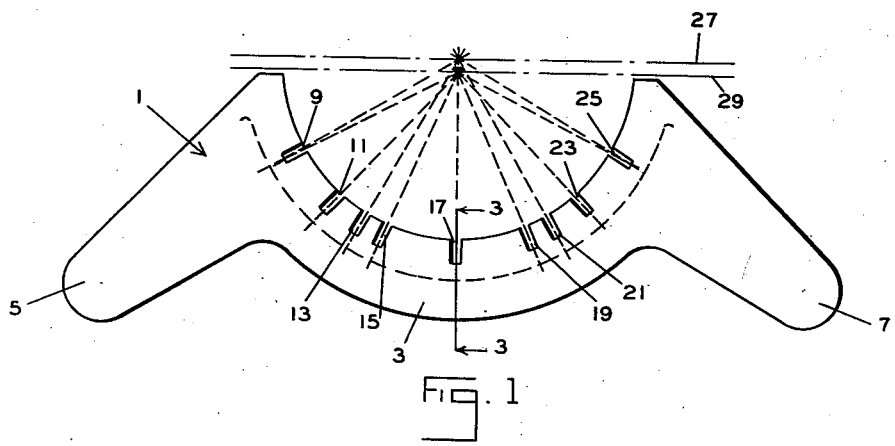
Fig. 1 is a plan view of a wrench of said embodiment.
Figure 2:
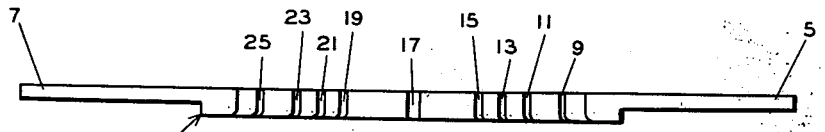
Fig. 2 is a view of the wrench of Fig. 1 as seen looking from the top of the sheet downwardly toward Fig. 1, with, however, the position of the wrench, in Fig. 2, rotated 180°.
Figure 3:
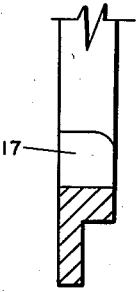
Fig. 3 is a fragmentary view partly in section taken substantially on the line 3—3 of Fig. 1.

Referring to the drawings in detail, it may be seen that I have shown a wrench 1 consisting of a semi-circular working portion 3 and a pair of handles 5 and 7. The semi-circular portion 3 is formed with a series of slots 9, 11, 13, 15, 17, 19, 21, 23 and 25.

I call the slots 9, 17 and 25 as primary slots and the remaining slots as intermediate slots. The slots 9, 13, 17, 21 and 25 are all spaced 30° from each other and the slots 9, 11, 15, 17, 19, 23 and 25 are spaced 20° from each other, the arcs being measured on an approximately 3 inch radius with the center on line 27. If the arcs are measured on approximately a 2½ inch radius with a center on line 29 the slots 9, 11, 15, 17, 19, 23 and 25 are uniformly spaced 22½° apart and the slots 9, 13, 17, 21 and 25 are uniformly spaced 33¾° apart. The inner or operating edge of the wrench is an arc of a circle having a center approximately half way between the centers on lines 27 and 29. Using the point on line 27 as a center, the primary slots 9, 17 and 29 are spaced 60° from each other. Using the point on line 29 as a center, said primary slots are spaced 67½° from each other. Using the intermediate point as a center, the primary slots are spaced approximately 64° from each other. The radius arc of the inner or operating edge may be varied from approximately 2½ inches to approximately 3 inches although I prefer to use a radius of 2¾ inches as shown.

Each of the slots is slightly flaring toward the center for the purpose of ease of application to the fins of the motor part and ease of removal therefrom. However, the flare of all of the slots excepting 9 and 25 is very slight. Slots 9 and 25 have a greater flare for the reason that centers of the flywheels (due to differing diameters) are spaced or positioned at a slightly different angle from these two slots, and these two slots must accommodate the fins of both types of flywheels. Slots 11, 13, 15, 19, 21 and 23 each accommodate only the fins of a particular size of flywheel and therefore the centers of these flywheels is at a constant point relative to these slots. Slot 17 is on the line joining the centers of the different size flywheels and therefore it is not required that this slot be flared as much as slots 9 and 25. By this arrangement, I have developed a wrench which is universal for all flywheels of substantially all types of lawn mower motors, the single wrench being all that is needed for any such type of motor and the single wrench providing a secure grip on the fins of any type of flywheel, providing slots for five of the fins of one type of flywheel and seven of the fins of other types of flywheels.

My wrench is shaped generally as an arc of a circle having a plurality of slots. It is to be especially noted that primary slots are equally spaced from each other. The intermediate slots form two series with the primary slots, each series being uniformly spaced. The primary slots 9 and 17 and the primary slots 17 and 25 are each spaced apart 60° when we consider the center as on line 27. With the same center the slot 13 is spaced 30° from each of slots 9 and 17 and the slot 21 is spaced 30° from each of slots 17 and 25.

Using the same center, the slot 23 is 20° from slots 19 and 25; the slot 19 is 20° from slots 17 and 23; the slot 15 is 20° from slots 11 and 17, and the slot 11 is 20° from slots 9 and 15.

On the other hand, using the center on line 29, the primary slots 9 and 17 and the primary slots 17 and 25 are each spaced apart 67½ degrees. With the same center, the slot 13 is spaced 33¾° from each of slots 9 and 17, and the slot 21 is spaced 33¾° from each of slots 17 and 25.

Using the same center the slot 23 is 22½° from slots 19 and 25; the slot 19 is 22½° from slots 17 and 23; the slot 15 is 22½° from slots 11 and 17, and the slot 11 is 22½° from slots 9 and 15.

It is to be understood that the above described embodiments of my invention are for the purpose of illustration only and various changes may be made therein without departing from the spirit and scope of the invention.

I claim:

A wrench having a work engaging edge formed as an arc of a circle, said work engaging edge having at least three primary slots and a plurality of series of intermediate slots, the primary slots being uniformly spaced from each other and each series of intermediate slots being uniformly spaced approximately 20° with each other and with all of the primary slots.

References Cited in the file of this patent

UNITED STATES PATENTS

| | | |
|---|---|---|
| 2,394,808 | Rohr | Feb. 12, 1946 |
| 2,614,445 | Riordan | Oct. 21, 1952 |